(12) United States Patent
Chan et al.

(10) Patent No.: US 8,107,525 B1
(45) Date of Patent: Jan. 31, 2012

(54) VARIABLE BIT RATE VIDEO CODEC USING ADAPTIVE TRACKING FOR VIDEO CONFERENCING

(75) Inventors: Kevin Chan, Ryde (AU); Stéphane Laveau, Paris (FR)

(73) Assignee: Avaya Inc., Basking Ridge, NJ (US)

( * ) Notice: Subject to any disclaimer, the term of this patent is extended or adjusted under 35 U.S.C. 154(b) by 1502 days.

(21) Appl. No.: 10/459,182

(22) Filed: Jun. 10, 2003

(51) Int. Cl.
*H04N 7/12* (2006.01)

(52) U.S. Cl. ......... 375/240.01; 375/240.26; 375/240.14; 375/240.08; 375/240.1

(58) Field of Classification Search .............. 375/240.01
See application file for complete search history.

(56) References Cited

U.S. PATENT DOCUMENTS

| | | | | |
|---|---|---|---|---|
| 4,791,660 | A | | 12/1988 | Oye et al. ......................... 379/88 |
| 5,376,968 | A | * | 12/1994 | Wu et al. ................... 375/240.14 |
| 5,440,346 | A | * | 8/1995 | Alattar et al. ............. 375/240.24 |
| 5,506,872 | A | | 4/1996 | Mohler .......................... 375/240 |
| 6,240,070 | B1 | * | 5/2001 | Kozdon et al. ................ 370/260 |
| 6,249,324 | B1 | * | 6/2001 | Sato et al. ...................... 348/705 |
| 6,577,767 | B2 | * | 6/2003 | Lee ................................ 382/236 |
| 7,082,612 | B2 | | 7/2006 | Okamoto et al. |
| 7,219,364 | B2 | * | 5/2007 | Bolle et al. .................... 725/105 |
| 7,295,608 | B2 | * | 11/2007 | Reynolds et al. ......... 375/240.01 |
| 7,551,673 | B1 | * | 6/2009 | Oh et al. ................... 375/240.16 |
| 2004/0001548 | A1 | * | 1/2004 | McIntyre ................. 375/240.16 |

OTHER PUBLICATIONS

Soongsathitanon, et al., "A New Orthogonal Logarithmic Search Algorithm for Fixed Block-Based Motion Estimation for Video Coding," date unknown.
Marpe, et al., "Video Compression Using Context-Based Adaptive Arithmetic Coding," Proc. IEEE International Conference on Image Processing (ICIP'01), vol. III, pp. 558-561, Oct. 2001.
Isard "The Condensation Algorithm", available at http://www.dai.ed.ac.uk/Cvonline/LOCAL_COPIES/ISARD1/condensation.html, last updated Sep. 30, 1998, pp. 1-4.

* cited by examiner

*Primary Examiner* — Jay Patel
*Assistant Examiner* — Jessica Prince
(74) *Attorney, Agent, or Firm* — Sheridan Ross P.C.

(57) ABSTRACT

The present invention is directed to a video communication system capable of providing adaptive compression of video image data. In particular, data regarding the range of possible motions and the respective probabilities of such motion within a scene are collected, and a compression algorithm appropriate to motions having high associated probabilities selected. In response to a change in the motions and associated probabilities within a scene, a new compression algorithm can be selected. The bit rate of data transmitted by a system in accordance with an embodiment of the present invention will therefore vary, depending on the content of an imaged scene and based on the compression algorithm applied in order to compress image data while maintaining appropriate detail.

28 Claims, 3 Drawing Sheets

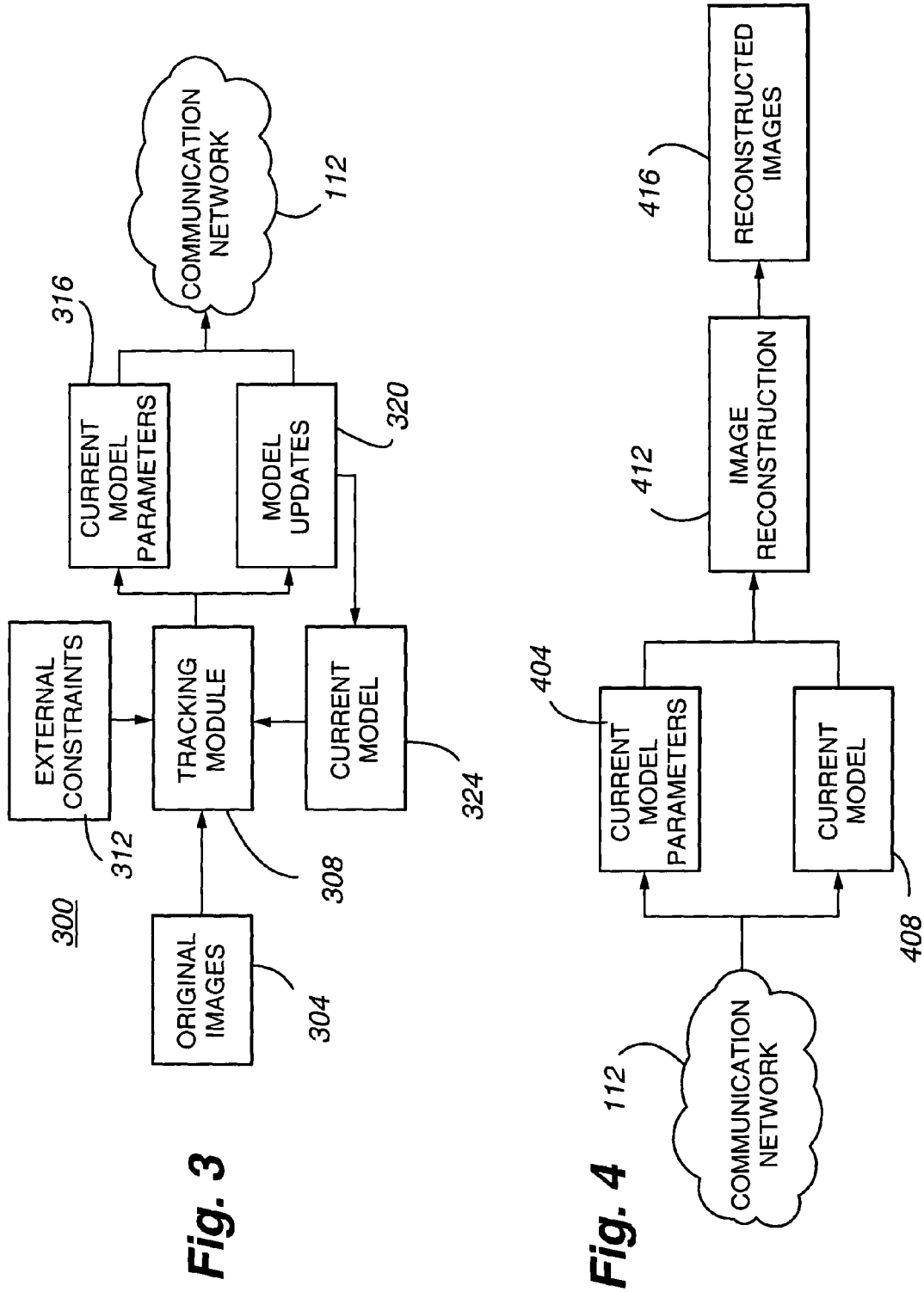

VARIABLE BIT RATE VIDEO CODEC USING ADAPTIVE TRACKING FOR VIDEO CONFERENCING

FIELD OF THE INVENTION

The present invention is related to reducing the amount of bandwidth used in connection with the transmission of video data in real-time. In particular, the present invention as related to providing a variable bit rate video CODEC using adaptive tracking.

BACKGROUND OF THE INVENTION

Video compression is used to reduce the amount of bandwidth that must be carried by a communication network in connection with video communications. In general, the quality of the compression will determine the amount of bandwidth required to transmit an image of a given quality. In a typical video compression scheme, temporal continuity (i.e., the fact that one image does not differ very much from frame to frame) allows only information related to the differences between adjacent images to be transmitted. Differences between particular algorithms that rely on temporal continuity generally relates to the model they use to express the differences between images.

An example of a video compression scheme includes MPEG 1, which uses a flat two-dimensional image-based block model. In particular, the MPEG 1 compression algorithm tracks blocks from one image to the next and transmits information related to the motion of the block, after applying some other compression to the block. Other compression schemes use more sophisticated models. For example, a scheme that can be beneficially applied to video conferencing uses only about 80 parameters to describe a face. These parameters may describe static attributes, like shape, and dynamic attributes, like expression. By sending only information related to these 80 parameters, the bandwidth required to transmit the image of a face is reduced as compared to transmitting the entire image pixel by pixel. Still other systems, like DivX, use a library of models to compress images when the imaging device is being, for example, panned or zoomed. The specific model applied with respect to an image frame is transmitted as one of the parameters describing the image.

The effectiveness of such approaches has been limited, because their application requires an a priori choice of the model or set of models that will be applied. Thus, a choice between a general model, which will likely provide good image quality but poor compression and a specific model, which can provide improved compression, but will exhibit poor performance if the actual attributes of the image are not well suited to that model, must be made. For example, if the compression algorithm or model assumes that the imaged scene is a human face, the compression algorithm will fail to provide good image quality if the actual image scene includes a number of different human faces. Other approaches, which vary the amount of compression applied to achieve a constant bandwidth requirement can provide insufficient information to satisfactorily represent highly detailed or fast-moving scenes. Constant bandwidth approaches can also use more bandwidth than is necessary in connection with relatively simple and/or slow-moving scenes.

SUMMARY OF THE INVENTION

The present invention is directed to solving these and other problems and disadvantages of the prior art. According to the present invention, image data from a scene is analyzed to determine a range of observed motions within the scene and the respective probability that such observed motions will occur in subsequent scenes. From the probability data thus obtained, a model capable of compressing the image data, while retaining suitable resolution can be selected. The process of calculating motion ranges and probabilities continues to be performed while image data is being collected, so that an appropriate compression algorithm is applied even if the characteristics of the imaged scene change. In an additional aspect, embodiments of the present invention provide the lowest bit rate possible for a given desired quality level. Accordingly, the bit rate associated with the transmission of images compressed using the present invention may vary in time.

BRIEF DESCRIPTION OF THE DRAWINGS

FIG. 3 is a block diagram of an application workflow in accordance with an embodiment of the present invention;

FIG. 4 is a block diagram of another application workflow in accordance with an embodiment of the present invention.

DETAILED DESCRIPTION

Figure 1:
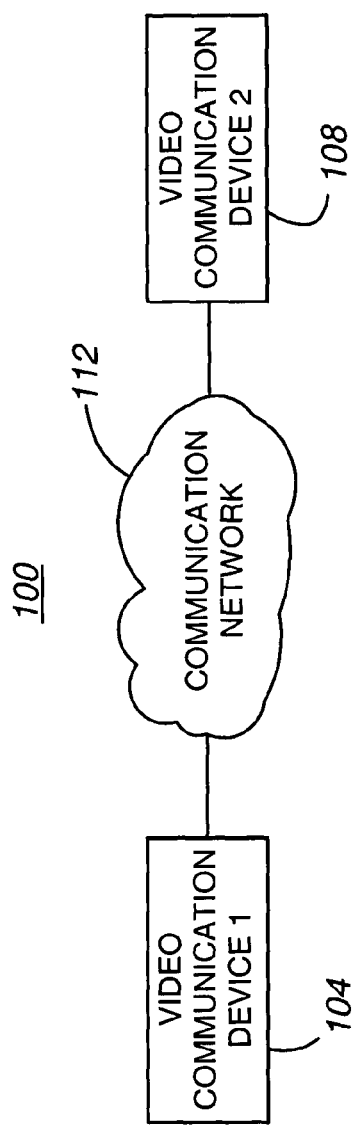
FIG. 1 is a block diagram of a communication system in accordance with an embodiment of the present invention.

With reference now to FIG. 1, a communication system arrangement 100 in accordance with an embodiment of the present invention is depicted. The communication system 100 generally includes a first video communication device 104 and a second video communication device 108 interconnected to one another by a communication network 112. In accordance with an embodiment of the present invention, the first video communication device 104 and/or second video communication device 108 comprise video telephones. In accordance with another embodiment of the present invention, the first video communication device 104 and/or second video communication device 108 comprise soft video phones implemented in connection with a general purpose computer. In general, the first video communication device 104 is capable of obtaining real-time video images of a scene and providing compressed image data to the communication network 112 for transmission to the second video communication device 108. In addition, the second video communication device 108 generally comprises a device that is capable of receiving compressed video data from the communication network 112 and decompressing that data for display. As can be appreciated by one of skill in the art, a typical video communication device 104, 108 will be capable of both obtaining video images of a scene and compressing that information, and of decompressing data received from the communication network 112 and displaying the associated image data, to allow real-time video communications between a user at each video communication device 104, 108.

The communication network 112 may comprise one or more networks capable of carrying compressed image data between the first video communication device 104 and the second video communication device 108. Accordingly, the communication network 112 may comprise a computer network, including a local area network (LAN), wide area network (WAN), a private intranet, or the Internet. In addition, the communication network 112 may comprise a public switched telephone network or wireless communication network.

Figure 2:
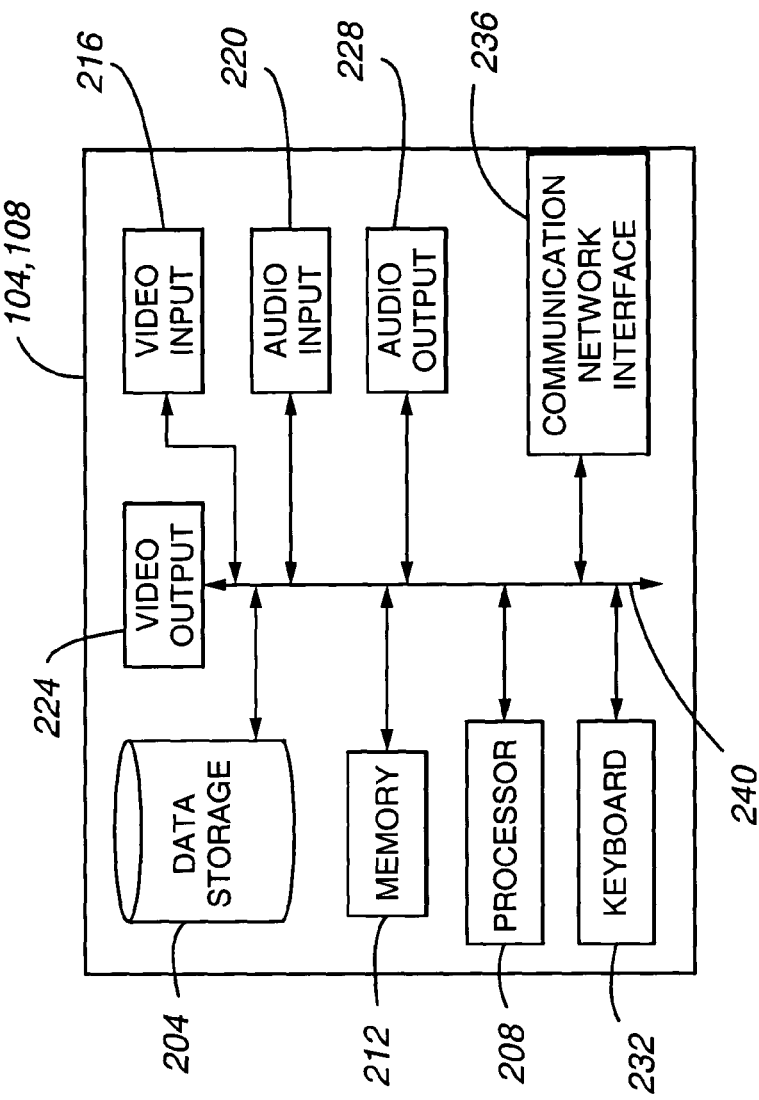
FIG. 2 is a block diagram of a video communication device in accordance with an embodiment of the present invention.

With reference now to FIG. 2, aspects of a video communication device 104, 108 in accordance with an embodiment of the present invention are illustrated in block diagram form. In generally, the video communication device 104, 108 may include data storage 204 for storing operating instructions and/or data. The data storage 204 may include magnetic storage devices, solid state storage devices, optical storage devices, logic circuits, or any combination of such devices. It should further be appreciated that the programs and data that may be maintained in the data storage 204 can comprise software, firmware or hard wired logic. The processor 208 may comprise a general purpose, programmable processor or digital signal processor, and may run application programs stored in the data storage 204 that implement the various functions of the video communication device 104, 108. Memory 212 may be provided for use in connection with the running of software or firmware by the processor 208. The memory 212 may comprise solid state memory, such as DRAM or SDRAM.

In addition, a video communication device 104, 108 in accordance with an embodiment of the present invention may include various input and output devices. For example, a video input 216 may be included for gathering image data and converting that image data into digital form. Accordingly, the video input 216 may comprise a digital video camera. An audio input device 220 for obtaining audio information and converting such audio information to digital form may also be provided. The audio input 220 may comprise a microphone and an associated analog to digital converter. A video output device 224 may be provided for displaying image information, including information transmitted to the video communication device 104, 108 across the communication network 112. The video output 224 may additionally be used to display operating parameter information to a user. The video output 224 may comprise a cathode ray tube, liquid crystal display, plasma display, or other image display device. An audio output device 228 may be included for providing audio output to a user. The audio output device 228 may comprise a digital to analog converter and a speaker. A video communication device 104, 108 may also include a keyboard or keypad 232 for receiving, for example, control information from a user. As can be appreciated by one of skill in the art, and in particular when implemented as part of or in connection with a computing device, the video communication device 104, 108 in accordance with an embodiment of the present invention may also include a pointing device (not shown).

A communication network interface 236 is provided for interconnecting the video communication device 104, 108 to the communication network 112. In general, the communication network interface 236 provides a physical interface appropriate to the requirements of the communication network 112, as the communication network 112 exists at the point of interface with the video communication device 104, 108. Accordingly, examples of a communication network interface 236 include a network interface card, such as an Ethernet interface, a modem, or a switched circuit telephony interface. A video communication device 104, 108 also generally includes a communication bus 240 to permit the exchange of data between the various components of the device.

With reference now to FIG. 3, an example application workflow 300 for the variable compression of image data is illustrated. As depicted by block 304, original images are obtained, for example by the video input 216 of a first video communication device 104. The original images 304 comprise a sequence of frames depicting the imaged scene. The original images 304 are provided to a tracking module 308. The tracking module 308 may be implemented, for example, by software loaded into memory 212 and executed by the processor 208. The tracking module 308 generally functions to determine the probabilities associated with motions occurring within the scene. For example, the range of possible motions within the scene as expressed by the motion of pixels along a selected vector and the respective probabilities of such motions may be obtained. In addition, the tracking module 308 applies a selected compression algorithm to the image data related to the original images 304. In accordance with an embodiment of the present invention, the algorithm initially applied is general, and thus capable of providing relatively good image quality, but with a lower compression rate than would be obtained by the use of an algorithm specifically adapted to the scene included in the original images 304. In accordance with another embodiment of the present invention, the tracking module 308 applies a compression algorithm that is adapted to characteristics of an expected scene. For example, a compression algorithm adapted to efficiently compress original images 304 comprising a human face can be selected when the expected scene comprises the face of a videophone user. According to still another embodiment of the present invention, the compression algorithm is randomly selected, or a last used algorithm is applied. As can be appreciated from the present disclosure, the system will generally converge towards an algorithm suited to the imaged scene over time. That is, as more probability data is obtained from a scene, the selected compression algorithm is more likely to accurately model the scene.

The external constraints block 312 represents various constraints on the system 100. For example, external constraints 312 may include a maximum bit rate that can be transmitted across the communication network 112, limitations on the maximum size of an individual image frame, and user-defined parameters relating to the acceptable level of image quality. Accordingly, external constraints determine aspects of the operation of the tracking module. Image data compressed by the tracking module 308 is provided to a current model parameters block 316 and a model updates block 320. The current model parameters block 316 signifies the values for the various parameters defined by the compression model that is applied with respect to a particular set of compressed image data received from the tracking module 308. The current model parameters block 316 may be implemented, for example, as software running on the processor 208 of a video communication device 104. The model updates block 320 monitors the probability data generated for each frame or set of frames by the tracking module 308. Based on the probability data, the model updates block 320 determines whether the compression model should be updated. Specifically, as more is learned about a particular scene being imaged, and in particular the range of possible motions and their respective probabilities, a compression algorithm that may be better-suited to the scene can be selected. A compression algorithm is better-suited to a scene than another algorithm if it provides better tracking and a more compact representation of the scene. For example, a compression model selected to efficiently transmit images of a single human face will provide poor image quality if the scene changes to include two human faces. Because a change in the image probabilities will accompany the change from 1 to 2 human faces, the model update block 320 can thus detect the need for a change in the applied compression model. The model update block 320 may also be implemented by software running on the processor 208.

In response to the selection of a new model by the new model update block 320, a message is provided by the model update block 320 to the communication network for transmission to the receiving video communication device (e.g., the second video communication device 108) identifying the newly selected compression algorithm. Accordingly, it can be appreciated that information regarding the compression algorithm does not need to be sent continuously with the model parameter data. Instead, such information need only be sent when the applied compression algorithm is changed.

In order to effect the change in the compression algorithm applied by the tracking module 308, the model update block 320 also provides information regarding the currently selected compression algorithm to the tracking module 308. The provision of this information is represented by the current model block 324. Thus, the current model block 324 signals to the tracking module 308 the compression algorithm to be applied to the data representing the original images 304.

With reference now to FIG. 4, a typical information workflow associated with the receipt of compressed video data in accordance with an embodiment of the present invention is illustrated. In general, a current model parameters block 404 receives values for the various parameters defined by the compression algorithm then in use from the communication network 112. The current model block 408 receives information identifying the compression algorithm used by the transmitting video communication device in compressing received image data. In accordance with an embodiment of the present invention, the current model block 408 receives information regarding the compression algorithm only when that algorithm is changed.

Information identifying the current model and the parameter values are received from the current model parameters block 404 and the current model block 408 at the image reconstruction block 412. In general, the information identifying the particular compression algorithm used to compress a frame of image data and the values associated with the parameters used by the compression algorithm, allow the imagine reconstruction block 412 to retrieve data representing a compressed version of the data corresponding to the original images 304. The current model parameters block 404, current model block 408, and image reconstruction block 412 may all be implemented by software running on the processor 208 associated with the receiving video communication device (e.g., the second video communication device 108).

The reconstructed images block 416 represents the display of the reconstructed original images to a user at the receiving communication device. Accordingly, the reconstructed image block 416 may be implemented in connection with the output 224 of the second video communication device 108.

Figure 5:
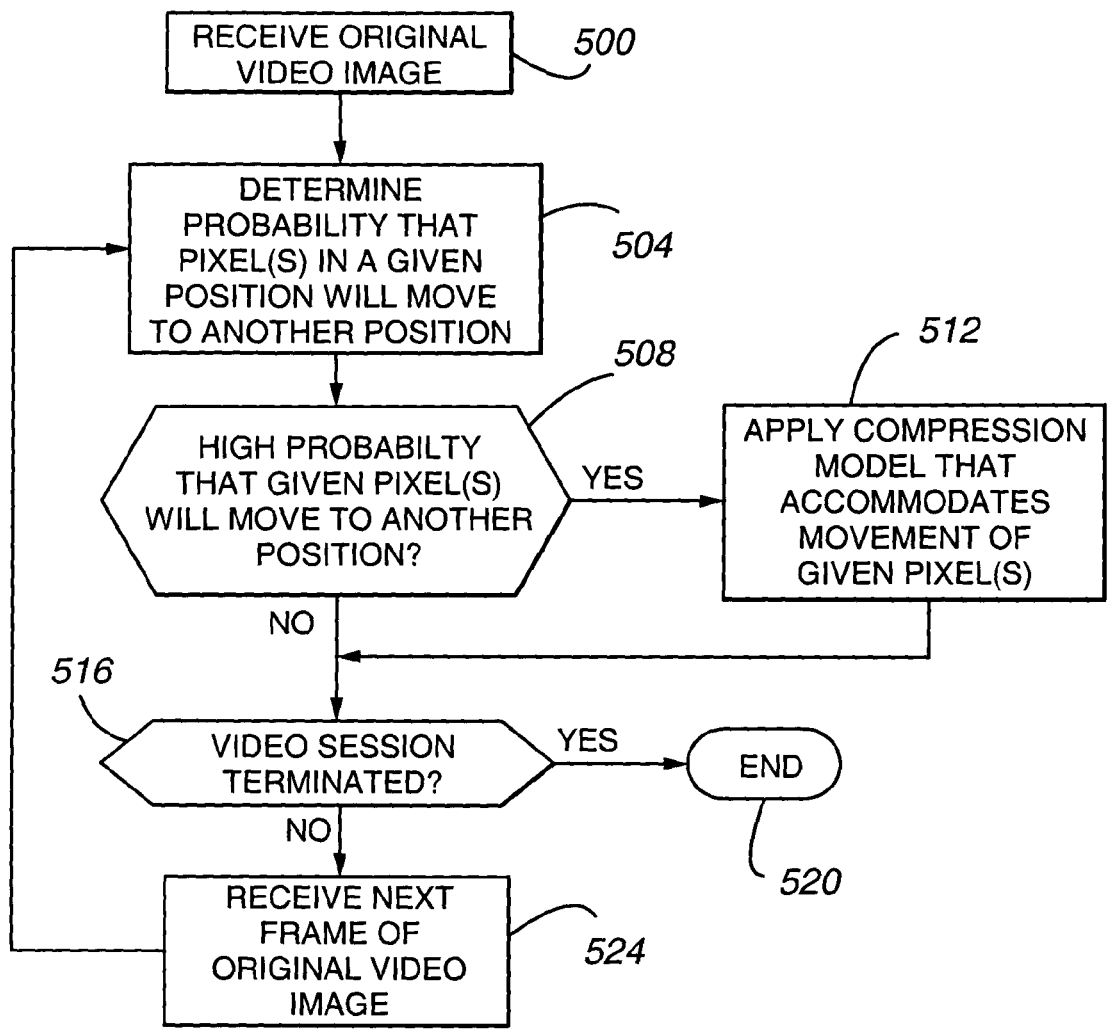
FIG. 5 is flowchart depicting the operation of an embodiment of the present invention.

With reference now to FIG. 5, the operation of an embodiment of a video communication device providing adaptive compression models in accordance with an embodiment of the present invention is illustrated. Initially, at step 500, original video image information is received. The original video information may comprise one or more frames of video data. At step 504, a probability that a pixel or pixels in a given position will move to another position is determined. Next, a determination is made as to whether the probability that a given pixel or pixels will move to another position is high (step 508). If the probability for movement of a given pixel or pixels is high, a compression model that accommodates movement of those pixels is selected and applied (step 512).

As can be appreciated by one of skill in the art, particular algorithms may be selected according to where pixels having a high probability of moving are located within the image, and according to the associated range of movement of those pixels. In accordance with another embodiment of the present invention, a next available compression algorithm in a set of algorithms is selected. It should be appreciated that the probability information does not necessarily compel or result in a change in the applied compression model. For example, the probability information may indicate that a selected compression module is or continues to be suitable for providing a relatively high compression ratio while providing suitable detailed image information.

After applying an appropriate compression model at step 512, or after a determination that the probability information is not sufficiently high to select a compression model, a determination is made as to whether the video session in connection with which the original video images are being received has been terminated (step 516). If the video session has been terminated, the process ends (step 520).

If the video session has not been terminated, the process continues to step 524, at which step a next frame of original video image information is received. The system then returns to step 504, and the probability that pixels in a given position within the next frame of information will move is determined. According to another embodiment of the present invention, the probability determination made with respect to a frame of video is made every x frames of video, rather than for every frame, where x is an integer number, to reduce processing requirements.

As can be appreciated by one of skill in the art from the foregoing description, the present invention allows a compression algorithm that is adapted to the particulars of a scene, as represented by original images, to be selected. Furthermore, it should be appreciated that this process may be performed continuously, for example, for the duration of a video conference. Accordingly, a system in accordance with the present invention is capable of altering the compression model applied in response to changes in the imaged scene. This allows embodiments of the present invention to maintain appropriate image detail, while typically providing compression ratios that are greater than a general purpose compression algorithm. It should further be appreciated that, as a result, a video communication device 104, 108 will transmit information across the communication network 112 at varying bit rates. In particular, a video communication device 104, 108 having a video input device 216 that provides a given image resolution may be operated to provide a first, relatively low bit rate in some circumstances, such as when the visual image data comprises a single human face, and may be operated to provide a second, higher bit rate in other circumstances, such as when the imaged scene has changed to include a number of human faces.

As can be appreciated by one of skill in the art, checks can be made at the transmitting video communication device (e.g., first video communication device 104) to ensure adequate image quality. For example, a compressed image can be compared to the original image to determine whether an appropriate compression algorithm has been selected.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for compressing video data, comprising:
    a video input receiving the video data, wherein the video data comprises two or more images;
    a processor executing an application program;
    the application program obtaining first image data related to a scene associated with a first communication session;
    the application program receiving an external constraint;
    the application program generating first probability data related to said first image data, wherein said first probability data is a probability that one or more pixels will move to another position in a next frame of video data;
    based on the first probability data and the external constraint, the application program automatically selecting a first compression algorithm to compress the video data, wherein selecting a first compression algorithm includes selecting only said first compression algorithm and no other compression algorithms;
    in response to selecting the first compression algorithm, the application program compressing at least a first frame of image data including said first image data by applying said first compression algorithm to obtain first compressed data, wherein said first image data is not compressed by any compression algorithm other than said first compression algorithm;
    sending first compressed data;
    while still receiving the video data, the application program obtaining second image data related to said scene associated with said first communication session;
    the application program generating second probability data related to said second image data, wherein said second probability data is a probability that one or more pixels will move to another position in a next frame of video data;
    based on said second probability data, determining by the application program whether to change from said first compression algorithm to a second compression algorithm;
    in response to determining that the first compression algorithm should be changed to said second compression algorithm, the application program automatically changing from application of the first compression algorithm to said second compression algorithm, wherein changing to the second compression algorithm includes selecting only said second compression algorithm and no other compression algorithms;
    in response to selecting the second compression algorithm, the application program compressing at least a second frame of image data including said second image data by applying said second compression algorithm to obtain second compressed data, wherein said second image data is not compressed by any compression algorithm other than said second compression algorithm; and
    sending second compressed data.

2. The method of claim 1, wherein said first and second image data comprises image data from a real-time video of said scene.

3. The method of claim 1, wherein a size of said first compressed data is greater than a size of said second compressed data.

4. The method of claim 1, wherein said first compressed data requires more bandwidth than said second compressed data.

5. The method of claim 1, wherein a bit rate for selected image data compressed by applying said first compression algorithm is less than a bit rate for said selected image data compressed by applying said second compression algorithm.

6. The method of claim 5, wherein said selected video data comprises a sequence of image frames.

7. The method of claim 1, wherein said first probability data comprises transition probability data, which is a probability that a pixel will move along a vector in a next frame of video data.

8. The method of claim 1, further comprising:
    comparing at least one of said first and second image data to at least one of said first and second compressed data; and
    in response to said comparison, selecting a third compression algorithm.

9. The method of claim 1, wherein said first image data and said second image data each comprise a number of image frames.

10. The method of claim 9, wherein said first compression algorithm comprises a model of differences between said frames comprising said first image data, and wherein said second compression algorithm comprises a model of differences between said frames comprising said second image data.

11. The method of claim 1, further comprising:
    transmitting an identification of said first compression algorithm to a receiving device;
    transmitting said first compressed data to said receiving device;
    transmitting an identification of said second compression algorithm to said receiving device; and
    transmitting said second compressed data to said receiving device.

12. The method of claim 11, further comprising:
    decompressing said first compressed data using said first compression algorithm;
    decompressing said second compressed data using said second compression algorithm.

13. The method of claim 12, further comprising displaying said first and second image data as real-time video data.

14. A method of adaptively compressing real-time video data, the method comprising:
    a video input receiving the video data, wherein the video data comprises two or more images;
    a processor executing an application program;
    the application program obtaining at least first and second image frames in connection with a first video session;
    the application program determining a first probability that at least a first pixel in a first position will move along a first vector;
    in response to said determined first probability, the application program selecting a first compression algorithm and no other compression algorithm based on the first probability, wherein said first compression algorithm models said movement of said at least a first pixel along said first vector;
    after determining said first probability and after selecting said first compression algorithm, the application program compressing an image frame using said first compression algorithm running on a first processing device to obtain a first compressed image frame;
    the application program transmitting said first compressed image frame over a first communication channel;

the application program transmitting information identifying said first compression algorithm over at least one of said first communication channel and a second communication channel;

while still receiving the video data, the application program obtaining at least a third image frame in connection with said first video session;

the application program determining a second probability that at least a first pixel in said first position with move along said first vector;

in response to said determined second probability, the application program selecting a second compression algorithm and no other compression algorithm based on the second probability, wherein said second compression algorithm models said movement of said at least a first pixel along said first vector;

after determining said second probability and after selecting said second compression algorithm, the application program compressing an image frame using said second compression algorithm running on at least one of said first processing device and a Second processing device to obtain a second compressed image frame;

the application program transmitting said second compressed image frame; and the application program transmitting information identifying said second compression algorithm.

15. The method of claim 14, further comprising:
compressing an additional image frame using said second compression algorithm to obtain a third compressed image frame;
transmitting said third compressed image frame.

16. The method of claim 15, wherein said step of transmitting said third compressed image frame does not comprise transmitting an additional identification of said second compression algorithm.

17. The method of claim 14, wherein a bit rate associated with said step of transmitting said first compressed image frame is different than a bit rate associated with said step of transmitting said second compressed image frame.

18. The method of claim 14, wherein said first compression model has a first compression rate, wherein said second compression model has a second compression rate, and wherein said second compression rate is greater than said first compression rate.

19. The method of claim 14, wherein said selecting a first compression algorithm in response to said first determined probability and said selecting a second compression algorithm in response to said second determined probability is performed by at least one of said first processing device, and said first processing device using a computational component comprising a computer readable storage medium containing instructions for performing the method.

20. The method of claim 19, wherein said computational component comprises a logic circuit.

21. An apparatus for compressing video data in real-time, the video data including two or more images, the apparatus comprising:
a tracking module, the tracking module operable to determine a set of probabilities related to each of at least first and second received image data, wherein the set of probabilities determines a probability that one or more pixels will move to another position in a next frame of video data, the tracking module operable to receive a user-defined parameter on a level of image quality for the video data, the tracking module operable to select a first compression algorithm based on the user-defined parameter and a first set of probabilities related to the first image data and operable to select a second compression algorithm based on the user-defined parameter and a second set of probabilities related to the second image data;

a compression module, the compression module operable to compress said first received image data associated with a first video session by applying a selected first one of a number of compression algorithms to said first received image data to obtain first compressed image data, wherein said first one of a number of compression algorithms is not applied to compress said first received image data until after said set of probabilities with respect to said first received image data has been determined and after said first compression algorithm has been selected in response to said set of probabilities determined by said tracking module with respect to said first received image data, and wherein only said first compression algorithm is applied to compress said first received image data, the compression module further operable to compress said second received image data associated with said first video session by applying a second one of a number of compression algorithms to said second received image data to obtain second compressed image data, wherein said second one of a number of compression algorithms is not applied to compress said second received image data until after said set of probabilities with respect to said second received image data has been determined and after said second compression algorithm has been selected in response to said set of probabilities determined by said tracking module with respect to said second received image data, and wherein only said second compression algorithm is applied to compress said second received image data; and a communication interface, operable to provide said first and second compressed image data, an identification of said first compression algorithm, and an identification of said second compression algorithm to a receiving communication device over a transmitting communication network.

22. The apparatus of claim 21, further comprising:
a memory, operable to store said number of compression algorithms.

23. The apparatus of claim 21, further comprising:
a transmitting network interconnected to said communication interface.

24. The apparatus of claim 23, further comprising:
a receiving communication device interconnected to said transmitting network operable to decompress and display said compressed image data using a decompression algorithm corresponding to said compression algorithm applied by said compression module.

25. The apparatus of claim 23, wherein said transmitting network comprises at least one of a wide area network, a local area network, and the Internet.

26. A video communication device, comprising:
means for obtaining real-time image data from a scene associated with a first communication session;
means for calculating a first set of probabilities related to first image data from said scene;
means for receiving an user-defined parameter on a level of image quality for the real-time image data;
means for automatically selecting a first compression algorithm in response to said calculated first set of probabilities and to user-defined parameter, wherein first set of probabilities is a probability that one or more pixels will move to another position in a next frame of video data;

means for compressing said first image data using said selected first compression algorithm, wherein said first image data is not compressed using said selected first compression algorithm until after said first set of probabilities related to first image data has been calculated and after said first compression algorithm has been selected in response to said calculated first set of probabilities, and wherein only said first compression algorithm is applied by said means for compressing with respect to said first image data;

while still in the first communication session, means for calculating a second set of probabilities related to second image data from said scene;

means for selecting a second compression algorithm in response to said calculated second set of probabilities; and means for compressing said second image data using said selected second compression algorithm, wherein said second image data is not compressed using said selected second compression algorithm until after said second set of probabilities related to second image data has been calculated and after said second compression algorithm has been selected in response to said calculated second set of probabilities, and wherein only said second compression algorithm is applied by said means for compressing with respect to said second image data, wherein the first communication session has at least two image data compressed by at least two compression algorithms.

27. The method of claim 1, wherein the external constraint is one of a group consisting of a maximum bit rate that can be transmitted, a limitation on a maximum size of a frame of video data, and a parameter related to an acceptable level of image quality for the video data.

28. The method of claim 27, wherein the parameter related to the acceptable level of image quality for the video data is set by a user.

* * * * *